United States Patent
Tanaka et al.

[11] Patent Number: 5,805,308
[45] Date of Patent: Sep. 8, 1998

[54] AUTOMATIC JUDGING DEVICE ABOUT IMAGE READ WIDTH

[75] Inventors: Masayuki Tanaka, Uji; Yujii Ohashi, Kyoto; Masashi Sugimoto, Kawanishi, all of Japan

[73] Assignee: Omron Corporation, Kyoto, Japan

[21] Appl. No.: 612,331

[22] Filed: Mar. 7, 1996

[30] Foreign Application Priority Data

Mar. 15, 1995 [JP] Japan .................................... 7-082088

[51] Int. Cl.$^6$ ............................. H04N 1/024; H04N 1/04; B65H 1/00; B65H 9/16
[52] U.S. Cl. ......................... 358/486; 358/473; 358/496; 358/488; 358/498; 382/286; 382/291; 399/370; 399/371; 271/171; 271/248; 271/249; 271/255
[58] Field of Search ..................................... 358/473, 496, 358/498, 488, 474, 494; 382/286, 291, 292; 399/371, 370, 376, 45, 372; 271/144, 226, 241, 248, 249, 253, 255, 171; 250/559.19

[56] References Cited

U.S. PATENT DOCUMENTS 4,597,652  7/1986  Dodge .......................................... 354/7
5,205,548  4/1993  Yamada et al. .............................. 271/3
5,573,236  11/1996  Petocchi et al. ..................... 250/559.19

*Primary Examiner*—Edward L. Coles, Sr.
*Assistant Examiner*—Kimberly A. Williams
*Attorney, Agent, or Firm*—Dickstein Shapiro Morin & Oshinsky LLP

[57] ABSTRACT

A conveyance device 4 for conveying a manuscript to an image reading section of a main body mounted by an image processing system is provided with a base member 6 removably fixed to the main body to provide a conveyance path 5, a driving mechanism and a manuscript guide member 8 for driving and conveying the manuscript. The manuscript is located between the manuscript guide member and a rib 9 at a left-hand side, and conveyed in a stable status. On a surface of a top end of a moving member 16 associated with the manuscript guide member is provided a white colored plate 17. A groove portion 18 other than the plate is dark, and the image is read to be binary coded whereby a pixel corresponding to the plate indicates "1". A position of the plate is located in the guide member or a right hand side edge of the manuscript, and a left hand side edge is fixed by the rib. Accordingly, a manuscript width (read width) Is determined from the pixel "1".

8 Claims, 15 Drawing Sheets

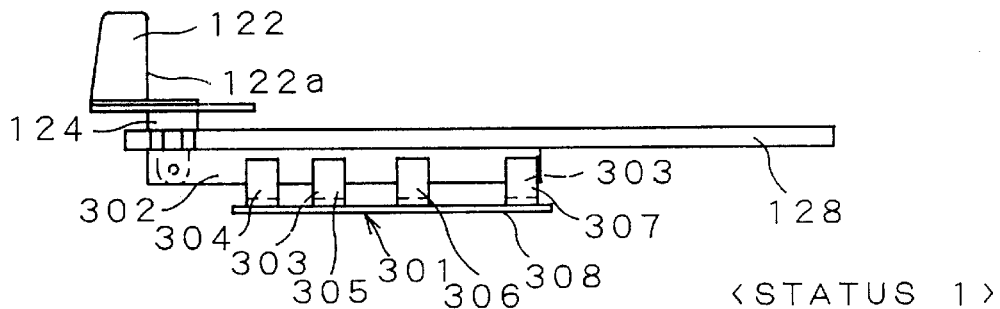
FIG. 18(a) <STATUS 1>
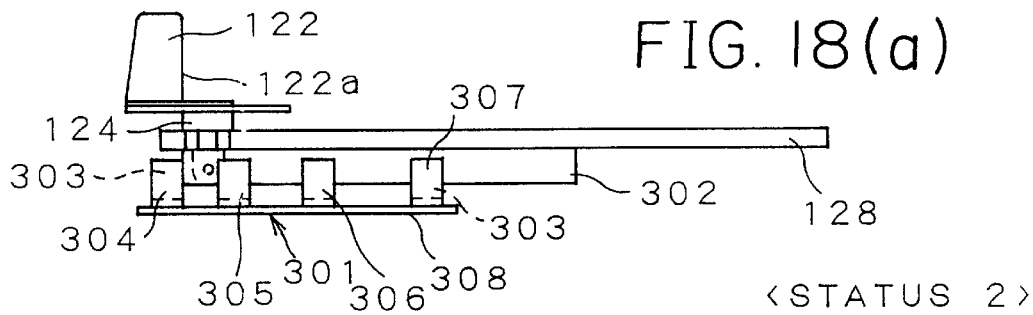
FIG. 18(b) <STATUS 2>
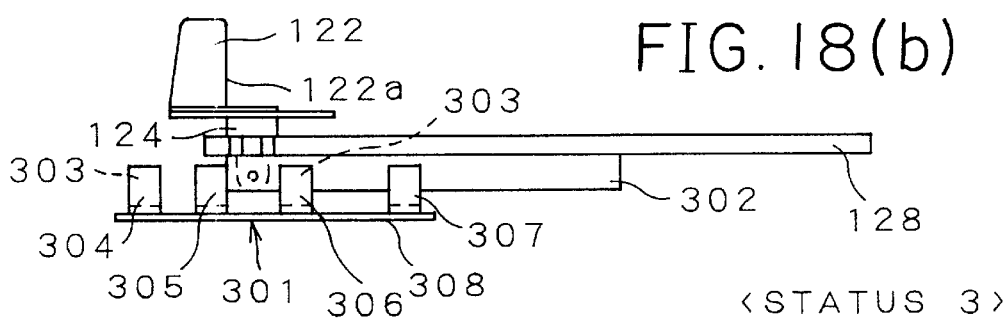
FIG. 18(c) <STATUS 3>
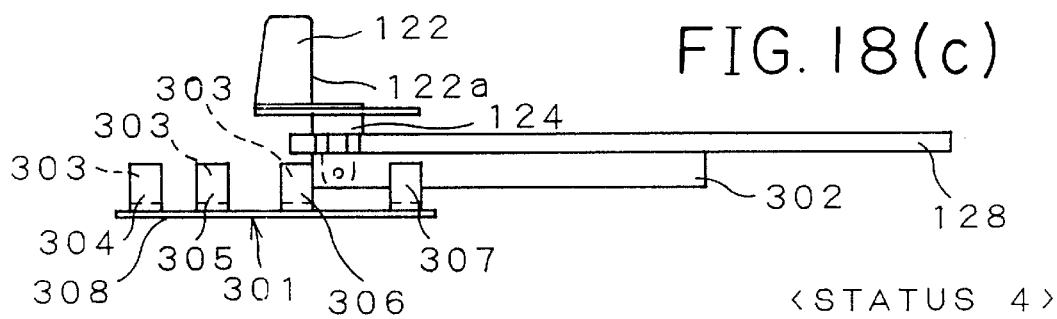
FIG. 18(d) <STATUS 4>
FIG. 18(e) <STATUS 5>

AUTOMATIC JUDGING DEVICE ABOUT IMAGE READ WIDTH

BACKGROUND OF THE INVENTION

1. Field of the Invention

This invention relates to an automatic judging device for automatically judging a read width to read an image, and more particularly to an improved device employed in an image reading apparatus such as a scanner, a facsimile or the like which automatically judges a read width at an image reading section in accordance with a width of a manuscript to be read thereby.

2. Discussion of the Related Art

If a conventional image reading apparatus such as a scanner or the like designed to always take an image in the maximum read width for image data processing irrespective of a width of a manuscript to be read by the apparatus reads a manuscript having a narrower width than the maximum read width (for example, if an image reading apparatus having the maximum read width of A4 size reads a manuscript of A6 size), a portion outside a truly necessary image is unnecessarily processed consuming memory and time.

In order to avoid such unnecessary consumption, the following methods have been proposed.

(1) Upon setting a manuscript to be read in an image reading apparatus, an operator selects one of a plurality of predetermined read width sizes of manuscripts or directly enters a numeral representing a read width on a menu screen or operation panel, which fits a width size of the manuscript to be read by the image reading apparatus, for setting a read range.

(2) Upon skimming over a manuscript at an increased processing speed with a rough resolution (this is called prescan), an operator sets a reading range by finding the read image data so that the manuscript is again set for original reading.

The above-mentioned conventional methods (1) and (2) have the following disadvantages:

In method (1), an operator is required to previously know a width of a manuscript to be read, and additional region setting operation is necessary for setting the manuscript to initiate reading. Thus operation is complicated; and Method (2) necessitates complicated and troublesome operation by having the reading operation performed on the manuscript twice.

SUMMARY OF THE INVENTION

It is, therefore, a primary object of this invention to provide an improved automatic image read width judging device capable of automatically judging a proper read width solely upon receiving a manuscript to be read in a manuscript feeding position so that manipulation by an operator is simplified, capacity of a memory for use is decreased, processing speed is increased, and its operation is improved.

According to one aspect of this invention, there is provided an automatic image read width judging device capable of automatically judging a read width of a manuscript in an image reading section of an image reading apparatus such as a scanner, a facsimile or the like, which is disposed in a feeding position of a manuscript conveying means for conveying said manuscript to the image reading section in a sliding movement in a width direction of the manuscript and crossing a conveying direction of the feeding position, the automatic image read width judging device including a manuscript guide member contacting an edge of the manuscript set in the feeding position for guiding the conveyance of the manuscript, a position detecting means for detecting a position of the manuscript guide member, and a judging means for judging a read width of an image to be read at the image reading section based on the detected position. Preferably the position detecting means is composed by an optical detecting means for optically detecting a position of a moving member associated with the manuscript guide member. The moving member is composed by a plate movable in a width direction within the read range which is extended from the manuscript guide member as a single unit to face the reading section, the plate having a color contrast different from a readable range portion neighboring the plate. The optical detecting means is an optical mechanism section of the image reading apparatus taking an image at the reading section, and the optical mechanism section may be designed to detect a position of the plate by the difference of contrast. The image reading apparatus may be a single unit of a console type, or have a construction including a main body having at the least an image reading section and a setting table with a manuscript guide member, the main body being removably mounted on the setting table, the main body mounted on the table being used for judging a read width of the image by the position detecting means and the judging means which is mounted in a predetermined position.

As a manuscript is set in the manuscript feeding position of the manuscript conveying means and the manuscript guide member is brought into contact with an edge of the manuscript, the position of the manuscript guide member is detected by the position detecting means and the judging means automatically judges an image read width in accordance with the width of the manuscript based on the detected position. Accordingly, an operator is not required to know any width size of the manuscript, nor to perform the read width setting operation on a software menu screen such as an operation panel, thus operation is simplified.

When the position of the manuscript guide member is converted into the position of the moving member associated therewith and the position of the moving member is detected by the optical detecting means, the judging device is easily incorporated into a space of an existing apparatus. Moreover because contact is not made deterioration due to wear-out does not happen and a judging process with a high degree of accuracy is ensured for an extended period of time.

The optical mechanism section of the image reading apparatus can be used as a detecting means by forming the moving member to be a plate facing a reading section and extended from the manuscript guide member as a single unit and designing the contrast of the plate to be different from the contrast of a readable range of the reading section. Thus, the cost of manufacturing is reduced and the plate is freely moved within a read range, so that a reading width of any manuscript can be optimally set with regard to a width of the manuscript.

When the position detecting means employs a plurality of on-and-off sensors, some sensors detect and some sensors do not detect depending on the position of the moving member. Since the above-mentioned member exists in a boundary between the detecting and not-detecting sensors (between sensors neighbored by both groups), the position of the moving member is known. Relatively wasteless read width can be obtained by setting to a size larger than the width The accuracy of this construction is lower than the above-mentioned construction but since the judging process is constructed with a simple logic circuit or the like high speed processing is achieved.

BRIEF DESCRIPTION OF THE DRAWINGS

Other objectives and advantages of this invention will be more readily apparent from the following detailed description provided in conjunction with the following figures, of which:

FIG. 18 shows a positional relation between a moving member and photo sensors of the device.

DETAILED DESCRIPTION OF THE INVENTION

Figure 1:
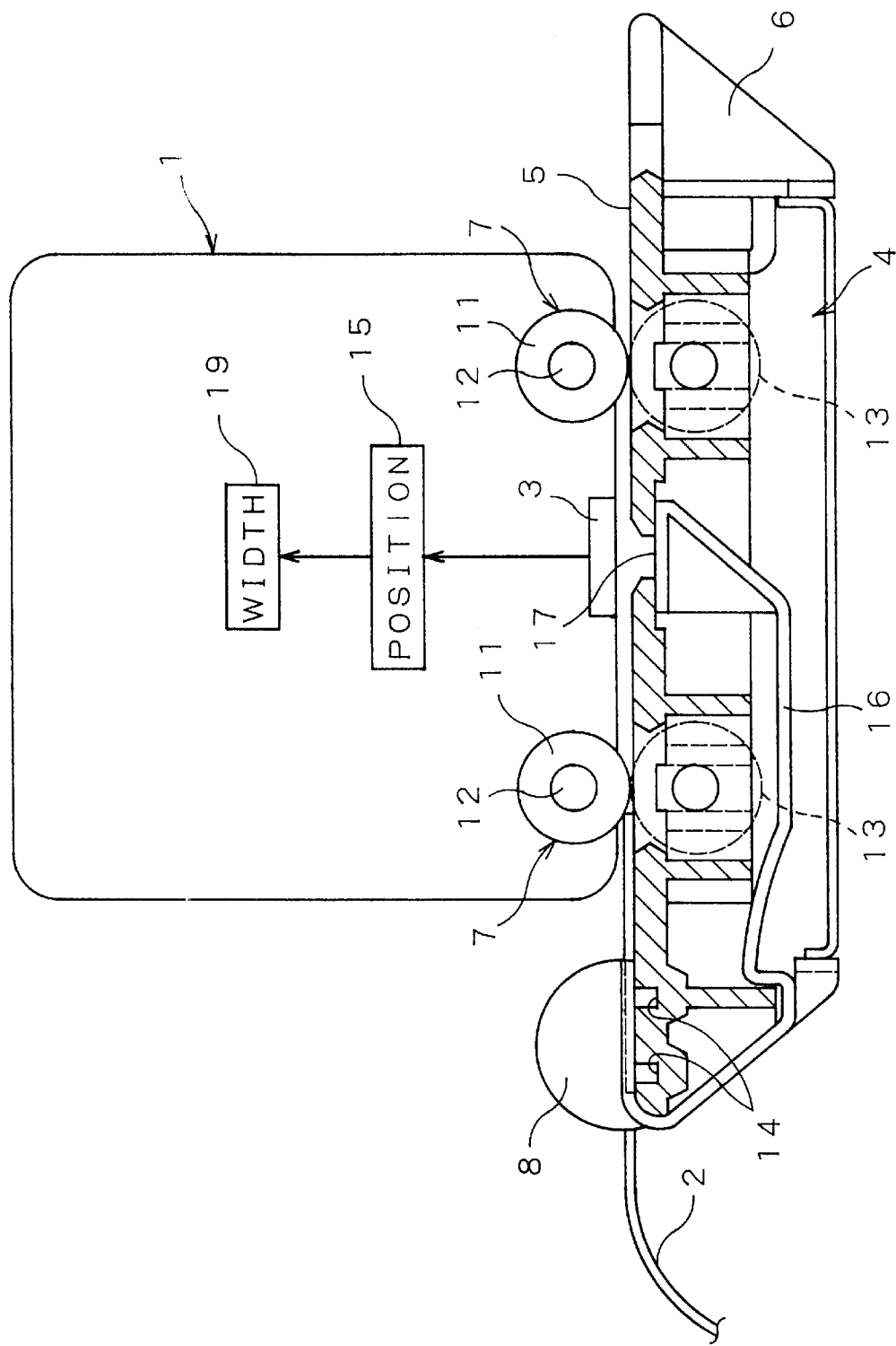
FIG. 1 is a sectional side view of an automatic image read width judging device as a first embodiment of this invention.

Referring, now, to FIGS. 1 to 7, there is shown a block diagram of an automatic image read width judging device as a first embodiment of this invention. As shown in FIG. 1, the device is designed to be mounted on an image read apparatus such as a scanner, a facsimile or the like, and includes a main body 1 housing therein an optical mechanism (not shown in the drawings) for reading an image and a conveyance device 4 for conveying a manuscript 2 to an image read section 3 of the main body 1.

The conveyance device 4 provides a conveyance path 5, and includes a base member 6 for removably fixing the main body 1 into a predetermined position in an engagement relationship, a driving mechanism 7 for driving and conveying the manuscript 2, and a manuscript guide member 8 for smoothly guiding the conveyance movement of the manuscript 2.

Figure 2:
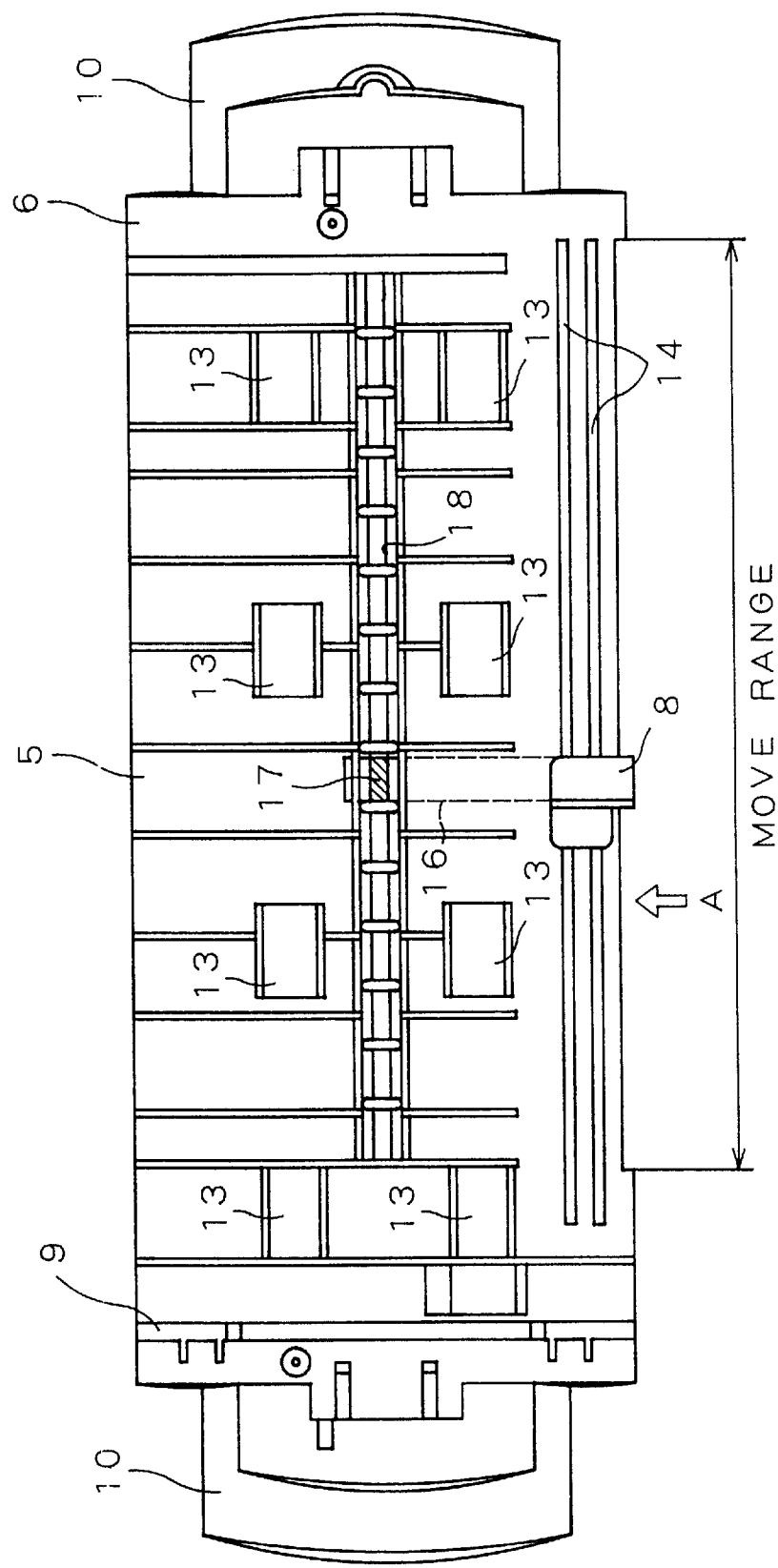
FIG. 2 is a plan view of a base member employed in the device of FIG. 1.
Figure 3:
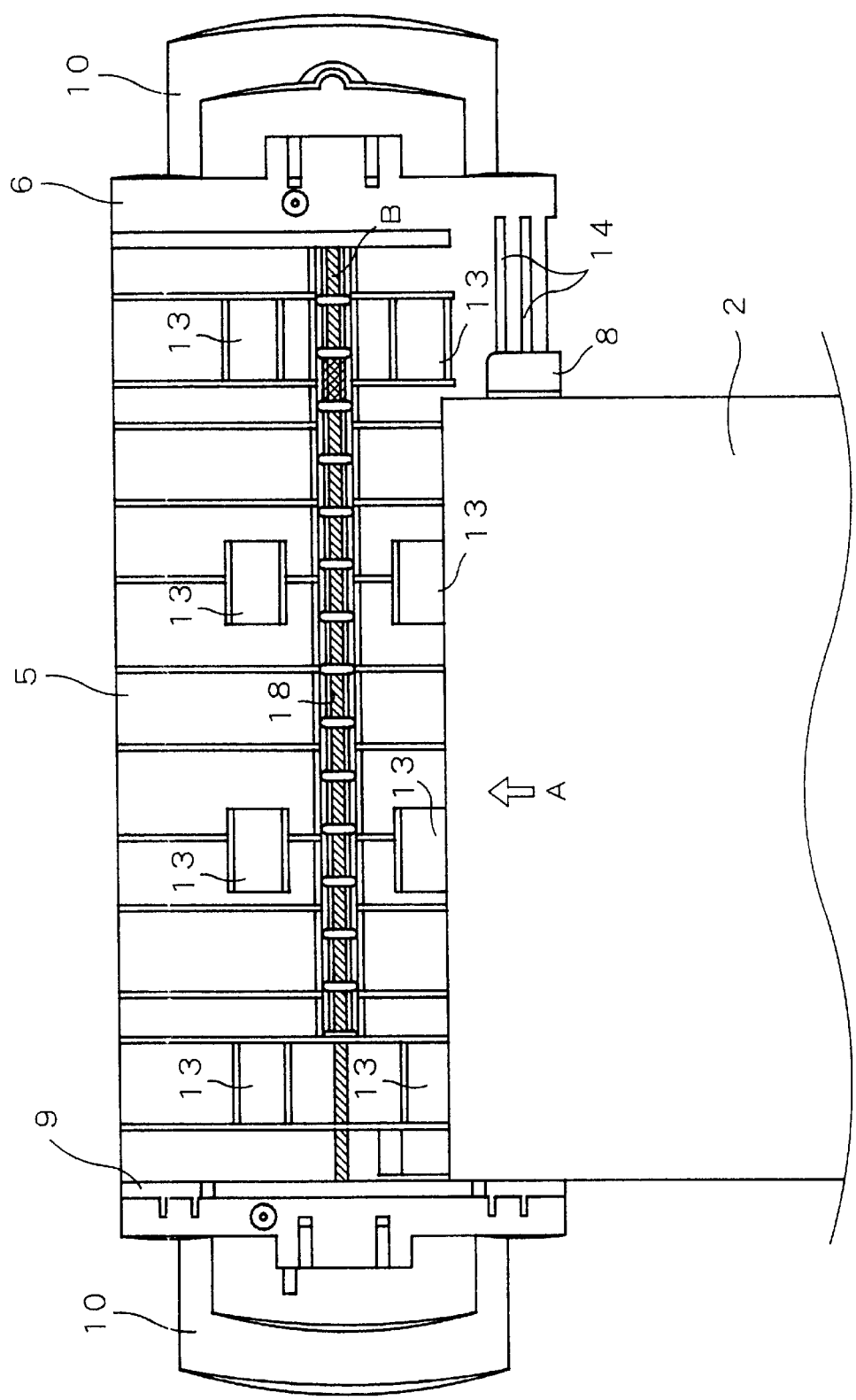
FIG. 3 is a plan view of the base member in which a manuscript is set.

FIGS. 2 and 3 show a upper plan view of the base member 6 having a general rectangular shape which is short in a conveyance direction (the direction of the arrow labeled A) of the manuscript 2 and long in a width direction of the same in its conveyance direction. On the base member there is provided a rib 9 integrally projecting from the base member in the conveyance direction to provide a position reference line for the conveyance path 5.

The base member 6 at both sides thereof is provided with engaging portions 10 integrally projecting therefrom. The main body 1 having the generally rectangular parallelepiped shape, long in the width direction, is mounted on the base member 6 by fixing the longitudinal side edges to the engaging portion 10. The main body 1 removed from the base member 6 serves as a handheld scanner to read an image on a manuscript by running thereon at a predetermined speed which cannot be read by putting the manuscript on the conveyance device 4. The conveyance device 4 and a housing mounted thereby provide a setting table.

The image read section 3 of the optical mechanism is disposed on a lower wall of the main body 1 across the whole width facing the conveyance path 5. Though not shown in the drawings, incident light entering into the main body 1 through the image read section 3 enters into an image pick up device such as a CCD through a predetermined optical mechanism to generate image data. The generated image data is applied to a predetermined image process which is placed into storage, printed out, or transmitted. The optical mechanism and the image processing section are housed within the main body 1. The optical mechanism is capable of reading an image over the whole width of the conveyance path 5, and over the image read range as shown by oblique lined portion B on the base member 6 of FIG. 3 at a center of a conveyance path with respect to the base member 6.

On a lower portion within the main body 1 there are disposed a pair or driving rollers 11 respectively mounted on a pair of rotary driving shafts 12 to provide the drive mechanism 7 for conveying and driving the manuscript 2. The pair of rotary driving shafts 12 are disposed at both sides of the image read section 3. Four driving rollers 11 are disposed on each of the rotary driving shafts 12 at predetermined spaces, and each roller 11 juts out slightly from the lower surface of the main body 1 for exposure.

Following rollers 13 are respectively so disposed as to slightly project from an upper surface of the base member 6 below the driving rollers 11 for engagement therewith so that the manuscript 2 is taken in between the respectively associated rollers 11 and 13 for conveyance.

An edge portion at the receiving end of the base member 6 at a paper feeding position for the manuscript 2, and a manuscript guide member 8 is disposed at the paper feeding position for smoothly guiding the movement of the manuscript 2 by regulating position shift in a width direction of the manuscript. The guide member 8 is slidably engaged with grooves 14 formed on the base member 6 in the width direction thereof, and adjusted to come into contact with a side edge of the manuscript 2 In its width direction set at the paper feeding position to guide the manuscript. The position reference line for the manuscript 2 is disposed at a left-hand side edge of the conveyance path 5. The manuscript 2 is positioned so that its read surface is facing upward and one of its side edges is contacted with the rib 9 at the left hand side of the conveyance path 5. The manuscript guide member 8 is slid to come into contact with another side edge of the manuscript 2.

Figure 4:
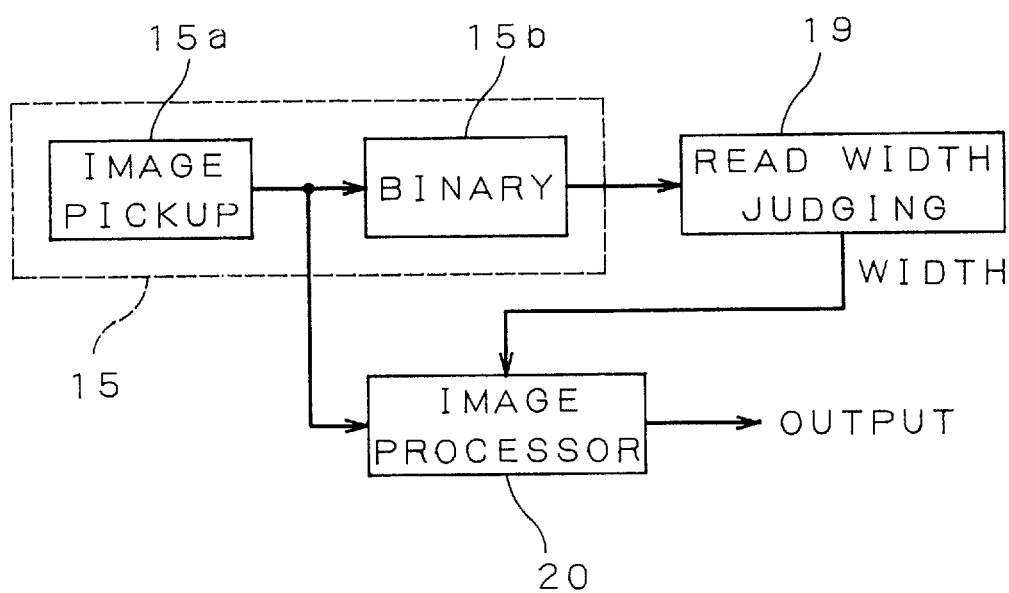
FIG. 4 is a schematic block diagram of a signal processing system employed in the device of FIG. 1.

A position detector 15 is housed within the main body 1 to detect the position of the guide member 8 in the width direction. The position of the guide member 8 is detected by an optical detecting means for detecting a position of a moving member 16 moving together with the manuscript guide member 8. The optical detecting means is played by a part of the optical mechanism within the main body 1. As shown in FIG. 4, the position detector 15 includes an image pickup unit 15a such as CCD, and a binary coding unit 15b for binary coding of image data taken by the pickup unit 15a. The incident light (image) from the image read section 3 within the main body 1 is applied to the pickup unit 15a through a predetermined optical mechanism. The optical mechanism and the pickup unit 15a are commonly used for normal image processing of the manuscript.

The output from the binary coding unit 15b (the portion corresponding to the position of the moving member 16 is "1" or "0") is applied to a read width judging unit 19 in which a read width of an image to be read by the image read section 3 is judged based on the detected position of the moving member 16 (the manuscript guide member 8), which will be described in detail later.

The moving member 16 extends to a portion just under the read section 3 through a lower side of the base member 6 from the manuscript guide member 8, and is movable in the width direction together with the guide member 8. A top end of the member 16 is formed to be flat to provide a flat plate 17. The base member 6 at a position just under the read section 3 is provided with a window opening 18 through which the plate 17 opposes the read section 3 and is movable in a width direction within the read range B along the window opening 18. The position in the width direction corresponds to the position of manuscript guide member 8.

The plate 17 has a contrast different from the readable range B besides the plate, viz., the window opening 18. The optical mechanism detects the position of the plate 17 by finding a difference in contrast from the image data obtained by reading the window opening 18. The detected position data is binary coded by the binary coding unit 15b to calculate a width of a manuscript and judge the manuscript width as an image read width.

An operation of the automatic image read width judging device will be described hereinafter together with a detailed function of the width judging unit 19. As shown in FIG. 3 where the main body is omitted for a simplified explanation, the manuscript 2 is placed in the feeding position to be adjusted along the reference line (rib 9). As the guide member 8 is moved to fit the manuscript 2, the plate 17 moves together with the guide member 8 to come into a position corresponding to the width of the manuscript 2 within the window opening 18. In this state, the manuscript 2 stops at a position where it contacts the roller 11 as shown in FIG. 2.

Figure 5:
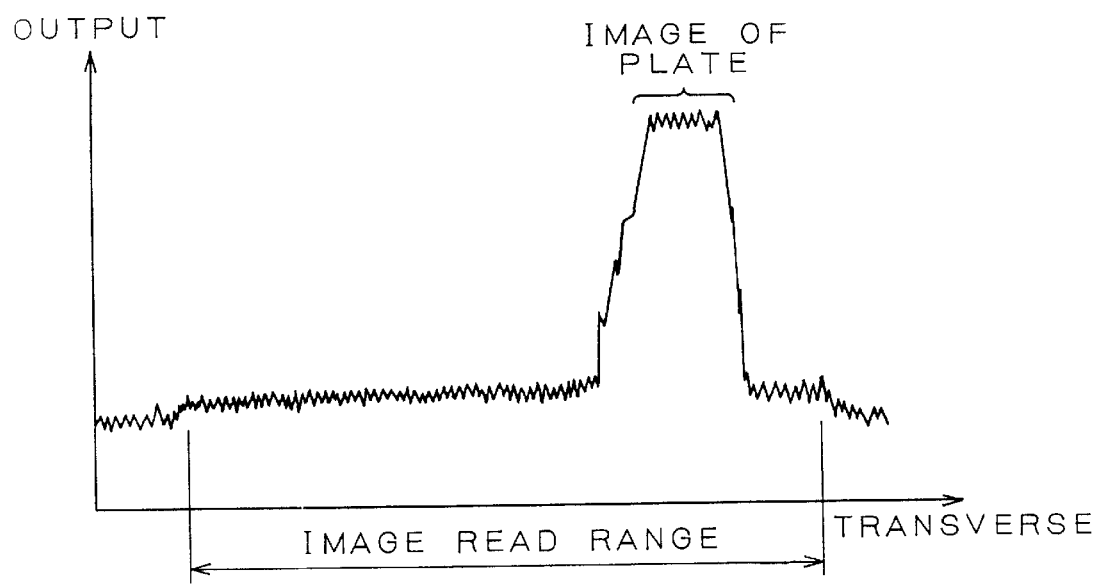
FIG. 5 is a waveform representing image data as produced by operation of the device.

Though reading starts at this state, the actual reading of the manuscript starts when the manuscript 2 reaches the read section 3. During the movement of the manuscript 2 from the feeding position to the read section 3 or prior to the start of the reading operation about the manuscript 2, the pickup unit 15a associated with the optical mechanism of the main body 1 reads the window opening 18 of the base member 6 over the whole width within the read region. Then, the plate 17 is colored with a different contrast from the read region B other than the plate 17 (for example, the plate 17 is white and other read region B is black), so that the image data generated from the pickup unit is shown in FIG. 5.

Figure 6:
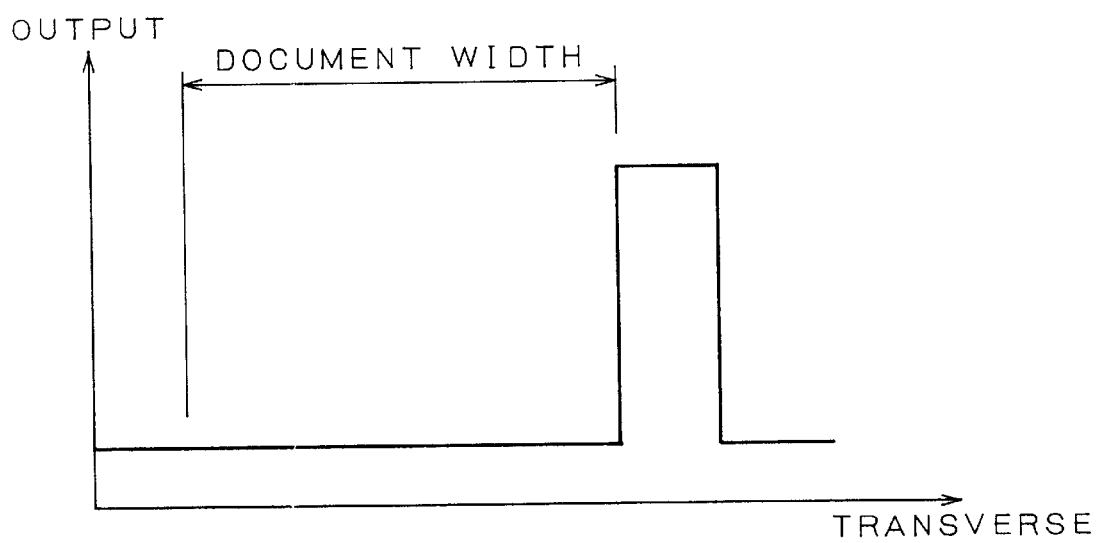
FIG. 6 is a binary coded waveform of the image data of FIG. 5.

The generated image data is binary coded by the binary coding unit 15b to be shown in FIG. 6, wherein the coding of "1" shows a position or the plate 17 formed in the moving member 16, viz., the position of the manuscript guide member 18.

Figure 7:
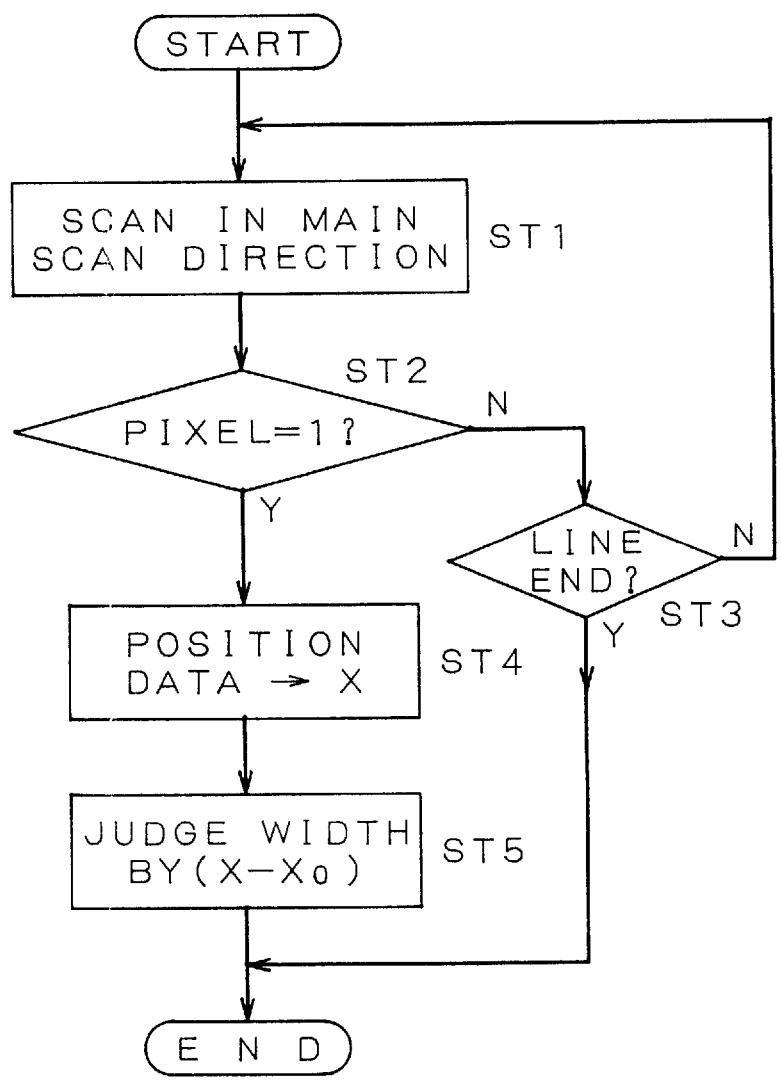
FIG. 7 is a flow chart explaining a function of an image read width judging section of the device of FIG. 1.

The binary image is utilized by the judging unit 19 to set a width size for the manuscript based on the binary image converted into "0" and "1". The judging process is represented by the flow chart as shown in FIG. 7, the manuscript is scanned for each pixel in a main scan direction, and it is judged if the scanned pixel is "1" (steps ST1 and ST2). If the scanned pixel is "0", binary data of the subsequent pixel is obtained, and the above-mentioned process is repeated until the end of the line in the scanning direction (line) unless there is found any pixel of "1" (step ST3).

As a pixel of "1" is detected, its position data is assigned a positional value of "X". As shown in FIGS. 5 and 6, the read region is given by a predetermined restriction. The position of the left-hand side edge of the manuscript 2 (the opposite side against the manuscript guide member 8) is fixed at the rib S. Accordingly, the existing position $X_O$ of the rib 9 is not always the same as an initial point of the binary image. The existing position $X_O$ is fixed and stored as a initial data, whereby a difference between an obtained position data X and the initial data is obtained to be judged as a document width which is determined as an image read width of the document subsequently read (step ST7). The determined width data Is applied to an image processor 20 for read processing of the manuscript. The processor 20 processes the image data only within the width, whereby the memory and processing time is saved.

An operator is not required to know in advance any size of the manuscript 2, nor to set a read width on a software menu or an operation panel. Thus, the operation is simplified.

Referring to FIGS. 8 to 15, there is shown a second embodiment of this invention. An image reading apparatus of the second embodiment is of a console type where an optical mechanism is not removable.

Figure 8:
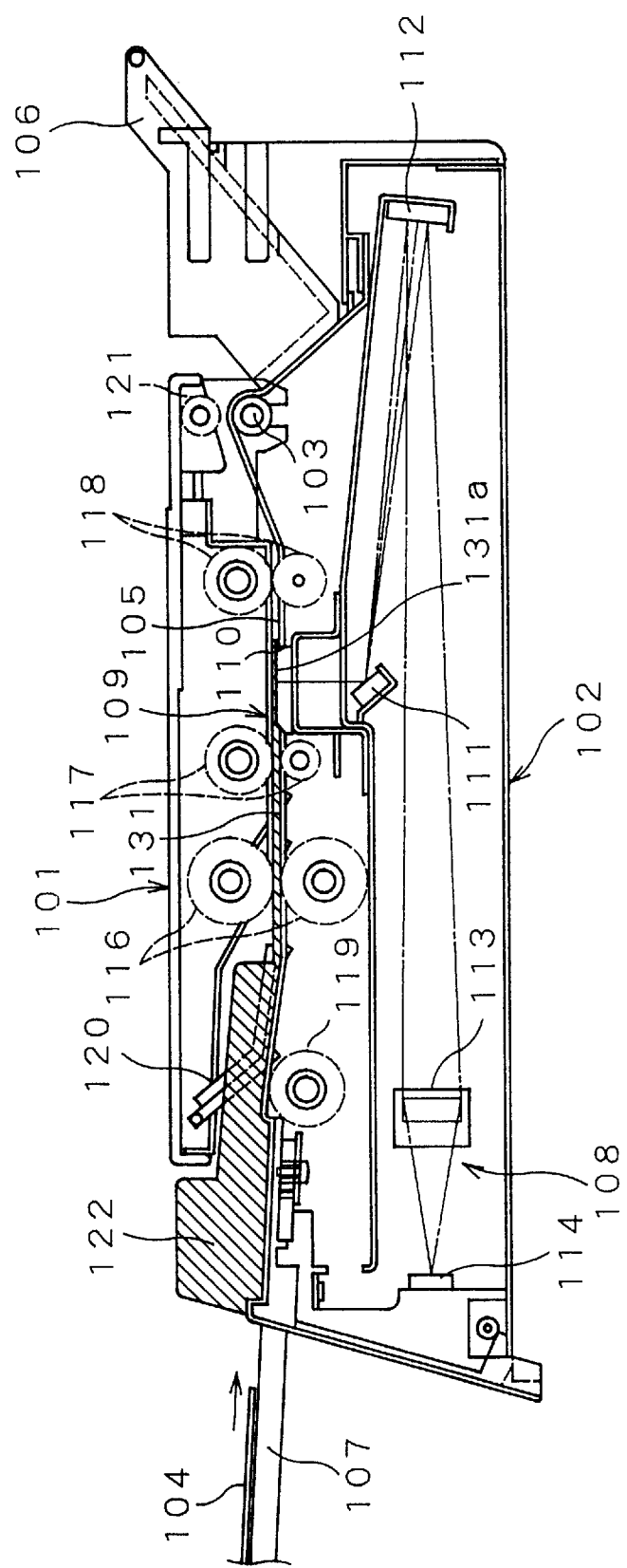
FIG. 8 is a side sectional view of an image reading apparatus employing an automatic image read width judging device as a second embodiment of this invention.

As shown in FIG. 8, the image reading apparatus includes an upper housing 101 and a lower housing 102. The upper housing 101 at its rear end is supported by a hinge pin 103 for a rotary movement with respect to the lower housing 102 in an open-and-close relationship. On an upper surface of the lower housing 102 there is provided a conveyance path 105 for a manuscript 104. The upper housing 101 in a closed position covers the path 105.

The hinge pin 103 is disposed near the location where manuscript 104 is discharged, and a discharge tray 106 is disposed on the lower housing 102 behind the hinge pin 103 for collecting the manuscript 104 once it has been discharged from the conveyance path 105. The lower housing 102 is formed to forwardly extend long from an open-and-close end of the upper housing 101 to provide a manuscript feeding position on a projection from a lower position or the open-and-close end or the upper housing 102. A paper feeding tray 107 is removably engaged with a front end of the lower housing 102.

An optical mechanism 108 is housed within the lower housing 102. An image read section 109 of the optical mechanism 108 is disposed in and across a conveyance path 105 in its width direction and is provided with a window opening 110 fitted by a transparent member such as glass in the lower housing 102. At a rear portion of the lower housing 102 and below the window opening 110, there are provided mirrors 111 and 112. An image read through the window opening 110 is reflected by the mirrors 111 and 112 to be focused through a lens 113 on an image pickup device 114 such as a CCD for reading an image. Light paths are shown as one-dotted lines.

As a conveyance device 115 for conveying the manuscript 104 set in the feeding position to the discharge tray 106 through the conveyance path 105, three pairs of rollers 116 and 117 are disposed in an upper stream of the reading section 109 and a pair of rollers 118 are disposed in its down stream in the upper and lower housings 101 and 102. In the lower housing 102 there is disposed a take-in roller 119 to smoothly take in the manuscript 104 set in the paper feeding position. Above the roller 119 there is disposed a press member 120 to facilitate the take-in operation of the manuscript. The press member 120 applies its load on the manuscript 104 to facilitate a rotary torque on the manuscript 104. When the manuscript 104 is first set, its forward end comes into contact with the first forward conveyance roller 116 and stops. At the rear end of the upper housing 101 there is disposed a discharging roller 121 to outwardly discharge the manuscript.

Though not shown, in the lower housing 102 there are assembled driving mechanisms for the rollers 116, 117, 118, 119 and 121 and image processors.

Figure 10:
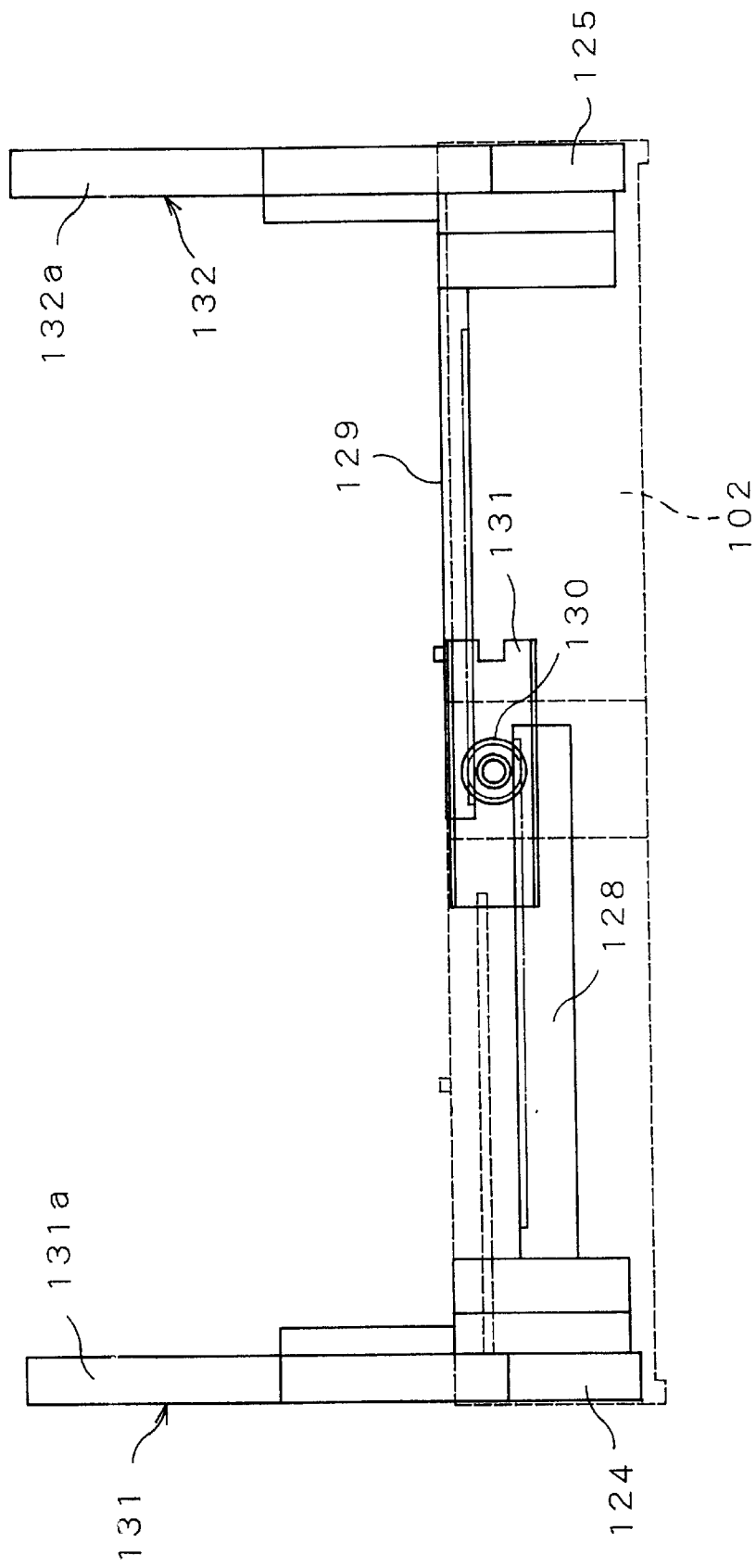
FIG. 10 shows a moving mechanism of a manuscript guide member employed in the device.
Figure 11:
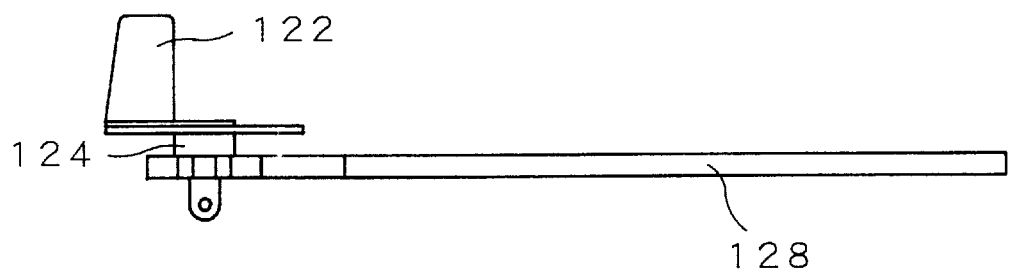
FIG. 11 shows one rack of the moving mechanism.
Figure 12:
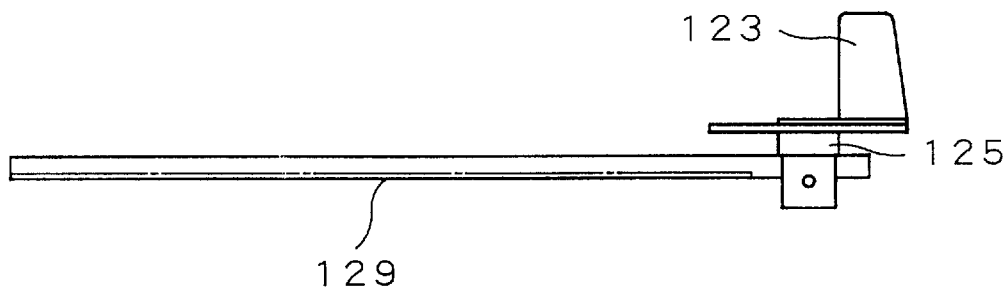
FIG. 12 shows another rack of the moving mechanism.
Figure 13:
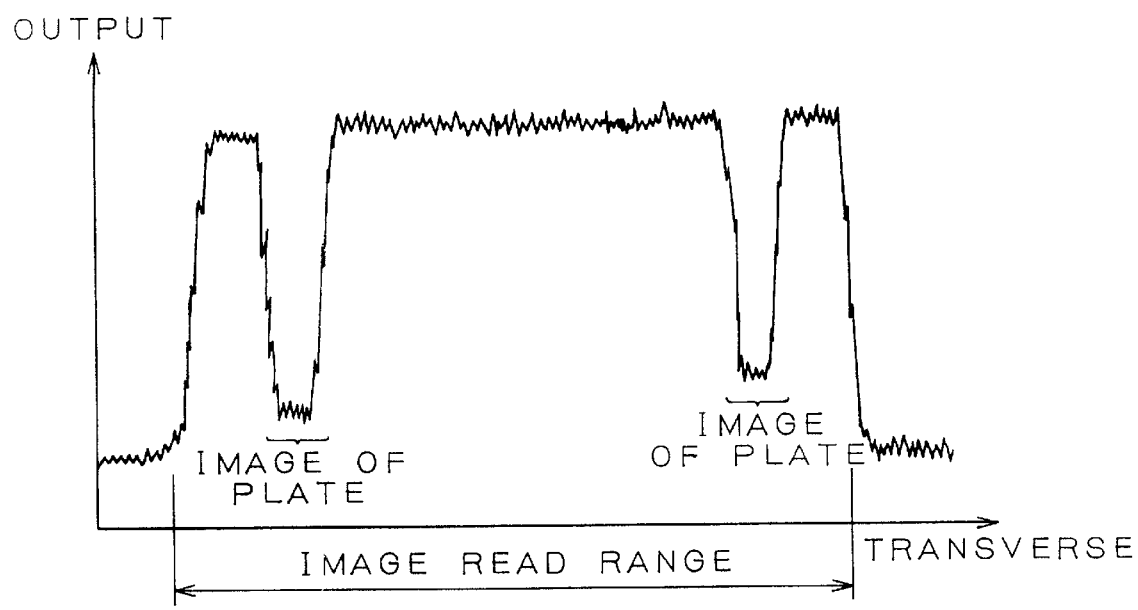
FIG. 13 is a waveform representing image data as produced by operation of the device of FIG. 8.

In the manuscript feeding position of the lower housing 102, a pair of left and right manuscript guide members 122 and 123 are disposed. The distance between the members is enlarged or shrunk by symmetrically approaching and departing with respect to a center as a reference. As shown in FIGS. 10 to 12, junctions 124 and 125 downwardly projecting are disposed on lower surfaces of the respective manuscript guide members 122 and 123, and extend to an inner portion of the lower housing 102 through grooves 126 and 127 extending in a width direction which are formed in the lower housing 102. The junctions 124 and 125 include racks 128 and 129 extending in a width direction along a back surface of the lower housing 102 as single units respectively. The both racks 128 and 129 oppose each other in an offset relationship and are engaged with a pinion gear 130 rotatably disposed on a center backside wall of the lower housing 102. A guide plate 131 is disposed under the engagement portion by the pinion gear 130 to retain the engagement.

The guide members 124 and 125 are provided with moving members 131 and 132 which are movable in the width direction together with the movement of the members 124 and 125. In this embodiment, the members 131 and 132 are respectively flat plates 131a and 132a formed as single units with the guide members 124 and 125. Top ends of the plates 131a and 132a extend backwards along the conveyance path 105 almost in a straight line, and reach the window opening 110 of the image read section 109 to face the read section 109 for a movement in the width direction within a read region. Back walls of plates 131a and 132a facing the window opening 110 of the read section are colored with a hue clearly different from that of an inner member 101a of the lower housing 101 which faces the window opening 110 and extends to the plate 131a and 132a. For example, the inner member 101a is white and the back walls of the plates 131a and 132a are black.

Figure 9:
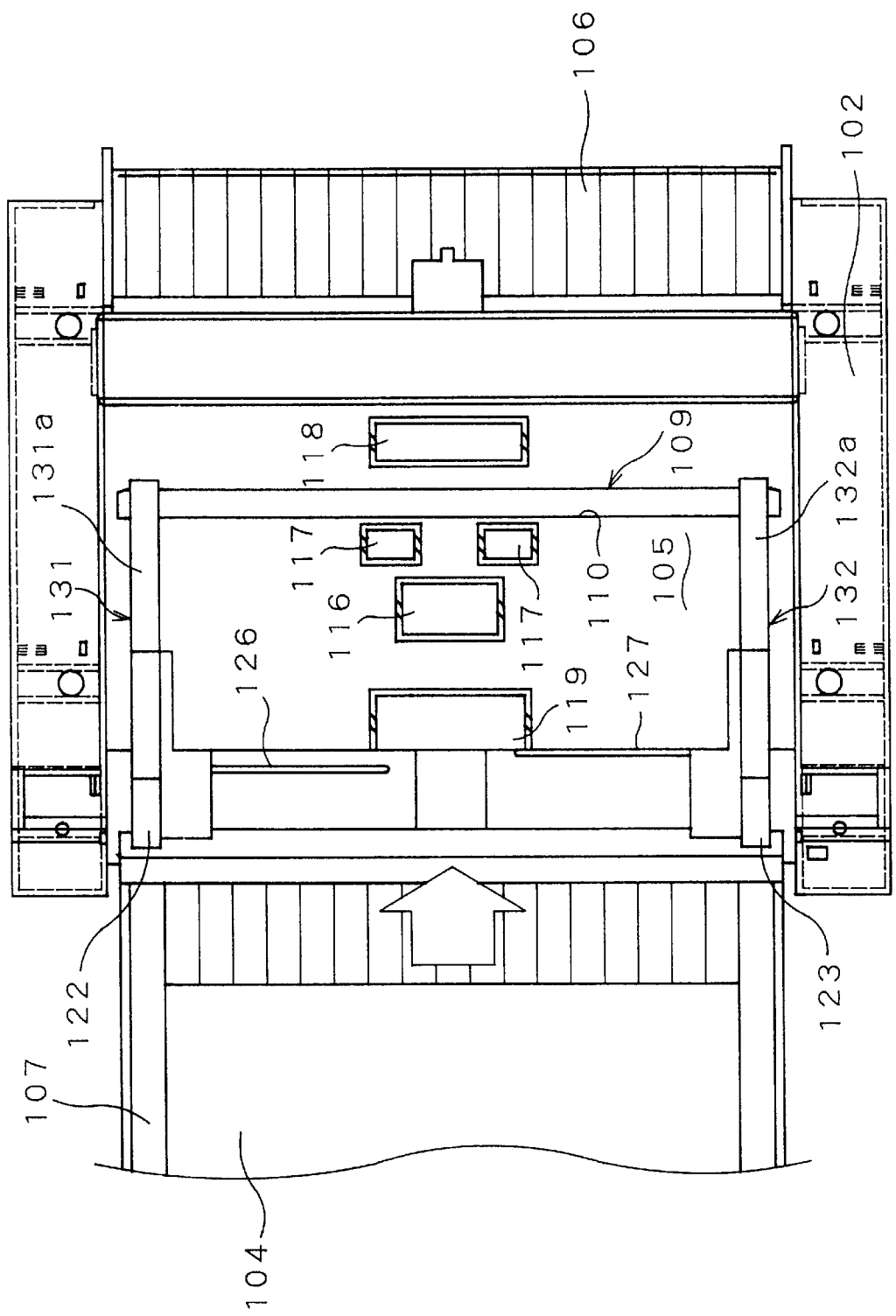
FIG. 9 is a plan view of the device of FIG. 8 with its upper housing removed.

The read reference line of this second embodiment is located at a center of the manuscript, the pair of right and left guide members 122 and 123 are so disposed that upon moving one of them both members 122 and 123 mutually move to close and open equally right and left. The top ends of plates 131a and 132a of the guide members 122 and 123 extend to the window opening 110 within the read range as shown in FIG. 9.

The block construction or FIG. 4 can be applied to this embodiment as a position detector, a read width judging unit or the like. The image pickup device 15a of FIG. 4 is the same as the image pickup device 114. The function of the judging unit of this embodiment is different from the first embodiment, and shown by a flow chart of FIG. 15.

The manuscript 104 to be read is put in the manuscript feeding position of the lower housing 102 by inserting its top end into a position contacting the first conveyance roller 119, and the manuscript guide members 122 and 123 are slid to come into contact with both edges of the manuscript 104 in its width direction, whereby the window opening 110 within a read region is separated by the top ends of the plates 131a and 132a having integrally formed guide members 122 and 123 which fit to the right and left ends of the manuscript 104 in its width direction.

The manuscript 104 in the set position contacts the conveyance roller 119 and stops. When the manuscript 104 is moving to the read section 109, white color on the inner wall of the upper unit 101 and black on the back walls of the pair of plates 131a and 132a is picked up by the pickup device 114 which generates a shading image data as exemplarily shown in FIG. 13 because the window opening 110 of the read section 109 is faced by the inner wall of the upper unit 101 and the back walls of the plates 131a and 132a.

Figure 14:
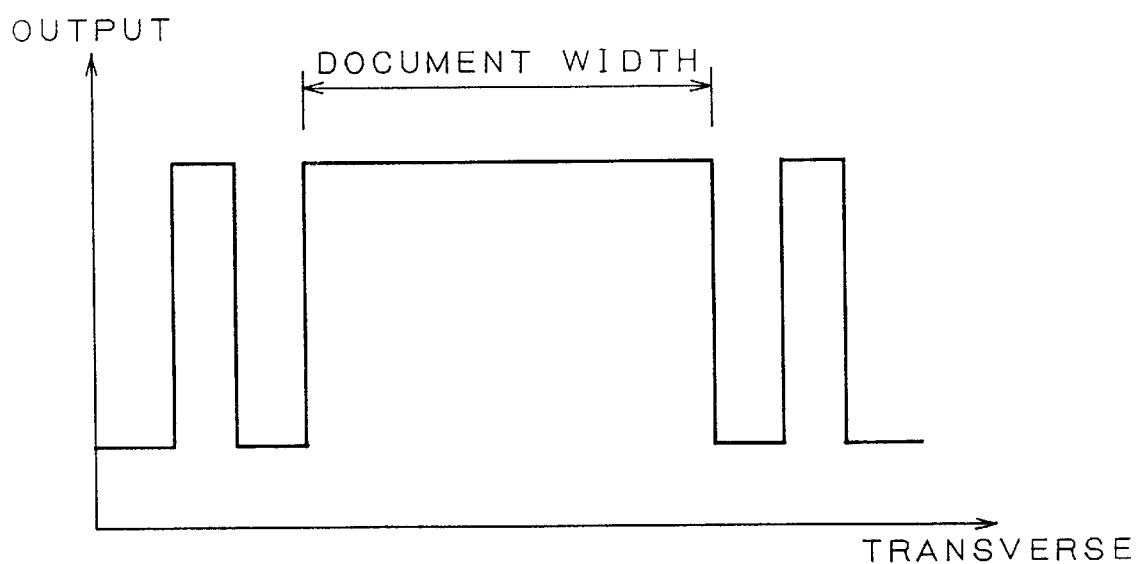
FIG. 14 is a binary coded waveform of the image data of FIG. 13.
Figure 15:
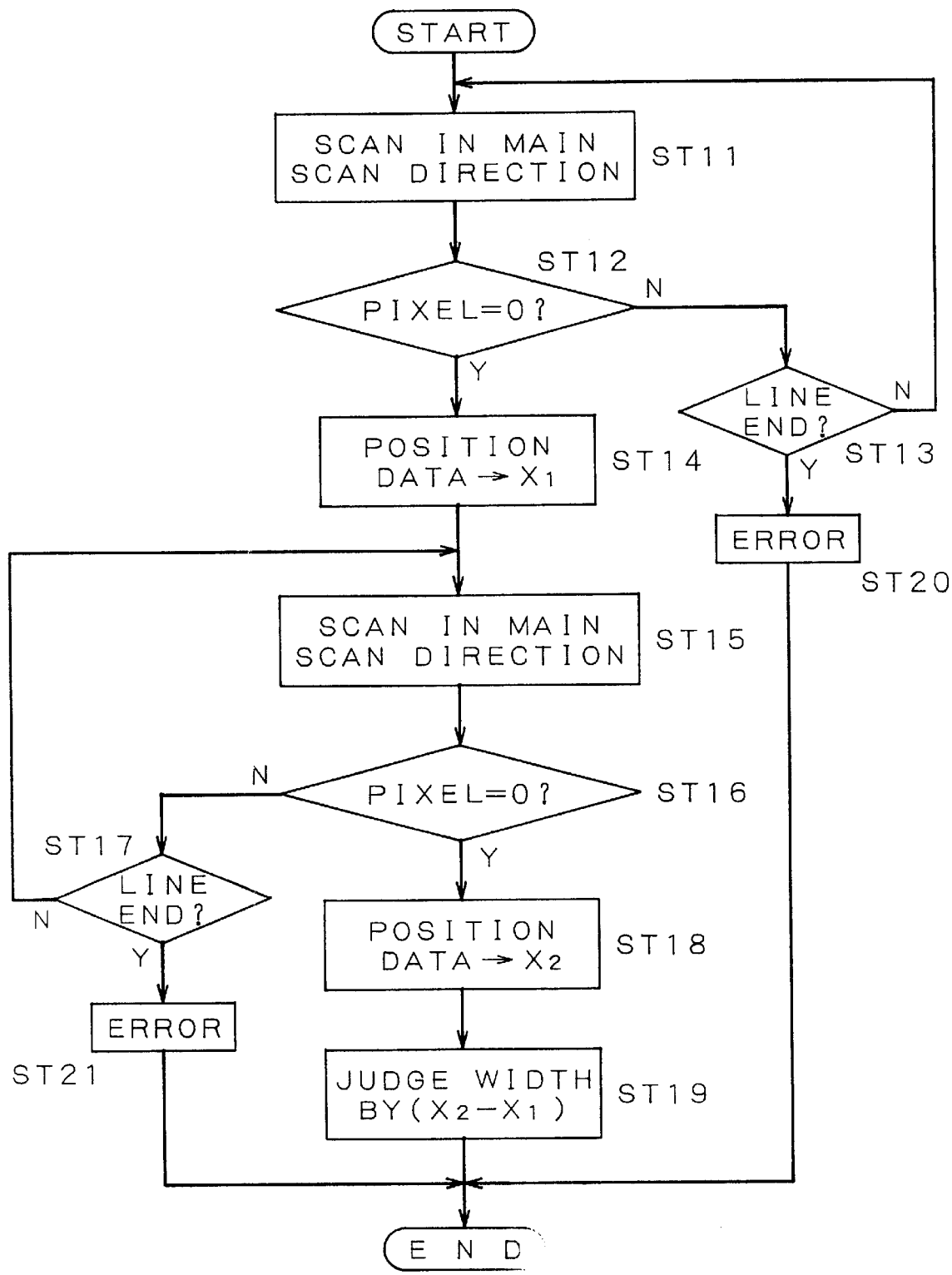
FIG. 15 is a flow chart explaining a function of an image read width judging section of the apparatus of FIG. 8.

The image data is binary coded by the binary coding unit to be converted into signals "1" and "0" as shown in FIG. 14. Based on the signals, a manuscript or document width is judged by the judging unit. Pixels are picked up from the leading edge of the document within the read range one by one, and it is inquired if the pixel is "0" (steps ST11 and ST12). The relation of "0" and "1" of this embodiment is opposite to that of the first embodiment. Accordingly, the decision flow is the reverse of that of the first embodiment. The output in a predetermined region from the initial point is "0", but since the region is out of judgement, so that the step 12 does not produce any YES response upon reading the predetermined region. If the scanned pixel is "1", binary data of the subsequent pixel is obtained, and the above-mentioned process is repeated until the line end (strictly speaking, the last of the read region) of the scanning direction (line) unless there is found any pixel of "0" (step ST13).

As a pixel of "0" is detected, its position data is obtained and assigned as "$X_1$". The position of $X_1$ is the existing position of one end (the left-hand side edge) of the manuscript 2, and the sequence moves to an extracting sequence for the existing position of another end (the right hand side edge). From a position skipped from the position $X_1$ by a predetermined pixels, scanning is restarted in a main scan direction to extract a position where the pixel is "0" (steps ST15 to ST17). The predetermined pixels in the restart of the step ST15 are skipped because the plate is designed to continually produce a pixel "0" so that the pixels "0" based on the same plate 131a are excluded. Accordingly, the skip width has a predetermined value larger than the pixels corresponding to the width of the plate 131a. The sequence may be so modified without such skip of pixels that the existence or absence of change of the binary data is detected and the step ST16 does not produce any YES response in case "0" continues after one "0" is found. Other various algorithm may be employed.

If the pixel "0" is found again, the position data is obtained to be stored as "$X_2$" (step ST18). A difference between thus obtained $X_1$ and $X_2$ is calculated, and the difference data is judged as the document width, and it is determined as a subsequent read width for the document or manuscript (step ST19). The determined width data is applied to the image processor 20 to process reading of the manuscript. The processor 20 processes only the image data within the read width, so that storage and the processing time are saved. When both positions of the plates (manuscript guide members) are not found, the sequence is regarded as being in error (steps ST20 and ST21).

In this sequence, the operator has only to put the manuscript on the feeding position and adjust the width of the manuscript guide members 122 and 123, whereby the operator is not required to know in advance any width size of the manuscript 104, nor to set a read width on a software menu or an operation panel. Thus, the most proper image read width corresponding to the width of the manuscript is automatically judged by a simple operation.

Figure 16:
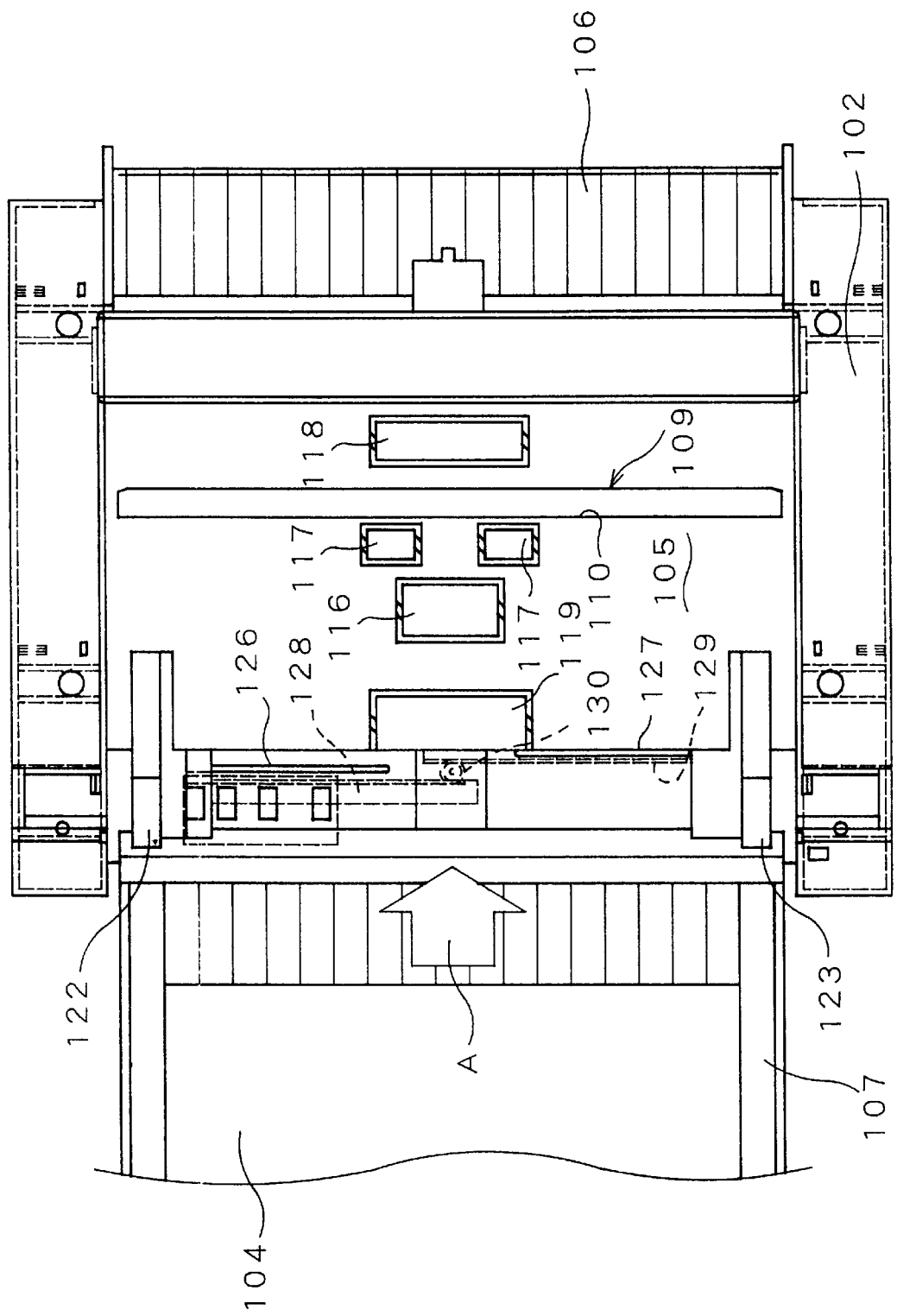
FIG. 16 is a plan view of an image reading apparatus employing an automatic image read width judging device as a third embodiment of this invention.
Figure 17:
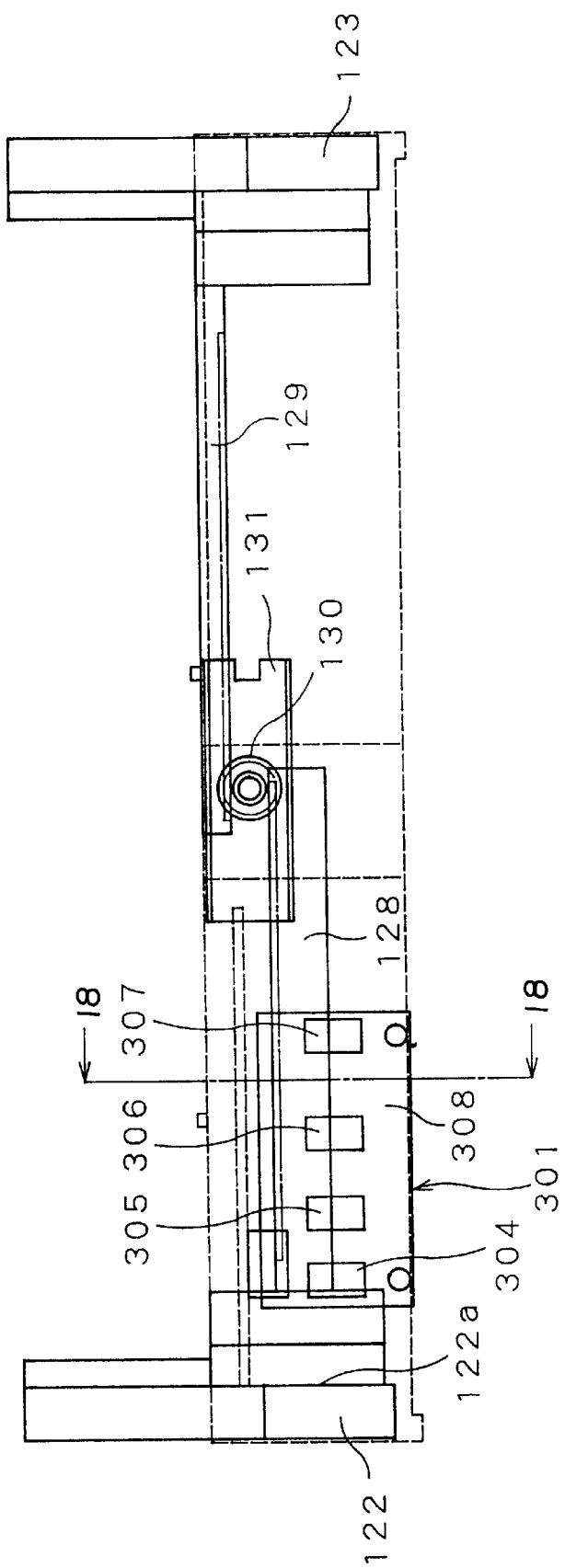
FIG. 17 is a major portion of the device of FIG. 16.

Referring to FIGS. 16 to 18, there is shown a third embodiment of an automatic image read width judging device according to this invention. The major construction of an image reading apparatus in this embodiment is same as that of the second embodiment, and the same components are given by the same reference numerals (the explanation of which is omitted) and only different portions will be described hereinafter.

In this third embodiment, the position of the guide member is detected by exclusive sensors, which is different from the second embodiment. FIG. 16 shows the image reading apparatus when the upper housing is removed. A pair of manuscript guide members 122 and 123 are disposed to close and open by the racks 128 and 129 and the pinion gear 130 which are closed and opened at the center as a reference.

FIG. 17 shows a moving mechanism of the manuscript guide members 122 and 123. FIG. 18 shows at (a) to (e) a sectional view of the mechanism taken along the line A—A in FIG. 17 and various relative position relationship between the guide members 122 and position detector 301. As shown in FIGS. 16 to 18, on a lower wall of a rack 128 of the guide member 122 there is disposed a plate-shaped moving member 302 integrally projecting downwardly from the lower wall and extending for a predetermined length from just under inner wall 122a of the guide member 122.

Under the rack 128 of the manuscript guide member 122, four transparent type of photo sensors 304, 305, 306 and 307 having grooves 303 are linearly disposed along the width direction as an optical detecting means for optically detecting the position of the moving member 302 moving in response to the guide member 122. These four photo sensors are mounted on a board 308 fixed to lower housing 102. The grooves 303 are designed to be passed by the moving member 302. When there exists the moving member 302 within the grooves 303, light is shaded and the output is off.

As the guide member 122 is slid for adjustment corresponding to a width size of a manuscript, the moving member 302 moves according to the width size of the manuscript to selectively shade the plurality of photo sensors 304 to 307. In this embodiment, as the width of the manuscript becomes larger, the moving member 302 subsequently shades the photo sensors starting from the inner one.

Accordingly, as shown in FIG. 18, the position relation of photo sensors 304 to 307 about the moving member 302 results in five possible scenarios depending on the position of member 122. Based on outputs from the four photo sensors, five kinds of manuscript widths or image read widths are easily judged by the judging unit.

When the rack 128 is positioned in grooves of all sensors 304 to 307 as shown at (a) of FIG. 18 (STATUS 1), the optical mechanism reads an image over a whole readable width for image processing. If the positions of the respective sensors are positioned to correspond to sizes, such as A4, B5, A5 and post card, of regular forms from the external side, a proper image read width is automatically judged about the manuscript to be read without omitting any image by judging a larger size of width than the detected regular form size.

In STATUS 2 as shown at (b) of FIG. 18, only an image within the A4 size is processed. In STATUS 3 as shown at (c) of FIG. 18, only an image within the B5 size is processed. In STATUS 4 as shown at (d) of FIG. 18, only an image within the A5 size is processed. In STATUS 5 as shown at (e) of FIG. 18 where all sensors are not shaded by the rack, only an image within the post card size is processed. Instead of photo sensors, microswitches may be employed to be selectively switched on or off by the moving member.

While the invention has been described and illustrated with respect to certain embodiments which give satisfactory results, it will be understood by those skilled in the art, after understanding the purpose of the invention, that various other changes and modifications may be made without departing from the spirit and scope of the invention, and it is therefore, intended in the appended claims to cover all such changes and modifications.

What is claimed is:

1. An automatic image read width judging device capable of automatically judging a read width in accordance with a width of a manuscript in an image reading section of an image reading apparatus such as a scanner, a facsimile or the like, comprising a manuscript guide member which is disposed at a manuscript feeding position of a manuscript conveying means for conveying said manuscript to said image reading section for a slide movement in a width direction of said manuscript crossing a conveying direction from said feeding position and contacts a side edge of said manuscript set in said feeding position for guiding the conveyance of said manuscript, position detecting means for detecting a position of said manuscript guide member, said position detecting means having a plate and an optical detecting means in a read section for detecting said plate, said plate opposing said optical detecting means, said plate being associated with said manuscript guide member so as to move in a width direction according to the movement of said manuscript guide member, and said position detecting means being located away from said manuscript guide member in said conveying direction, and judging means for judging a read width of an image to be read at said image reading section based on said detected position.

2. An automatic image read width judging device according to claim 1, in which said plate is movable in the width direction within a read range which is extended from said manuscript guide member as a single unit to face said reading section, said plate has a different contrast from a readable range portion neighboring said plate, and said optical mechanism section is designed to detect a position of said plate by the difference in contrast.

3. An automatic image read width judging device according to claim 2, which includes a main body at least provided with said image reading section and a setting table at least provided with said manuscript guide member, said main body being removably mounted on said setting table in a predetermined position to provide said image reading apparatus, said main body being used for judging said image read width by said position detecting means and said judging means.

4. An automatic image read width judging device according to claim 1, which includes a main body at least provided with said image reading section and a setting table at least provided with said manuscript guide member, said main body being removably mounted on said setting table in a predetermined position to provide said image reading apparatus, said main body mounted on said table being used for Judging said image read width by said position detecting means and said judging means.

5. An automatic image read width judging device according to claim 1, in which said manuscript conveying means is a roller conveyor having pairs of rollers arranged in said conveying direction, and a pair of rollers are located between said manuscript guide member and said position detecting means.

6. An automatic image read width judging device according to claim 5, in which said plate is movable in the width direction within a read range which is extended from said manuscript guide member as a single unit to face said reading section, said plate has a different contrast from a readable range portion neighboring said plate, and said optical mechanism section is designed to detect a position of said plate by the difference in contrast.

7. An automatic image read width judging device according to claim 6, which includes a main body at least provided with said image reading section and a setting table at least provided with said manuscript guide member, said main body being removably mounted on said setting table in a predetermined position to provide said image reading apparatus, said main body being used for judging said image read width by said position detecting means and said judging means.

8. An automatic image read width judging device according to claim 5, which includes a main body at least provided with said image reading section and a setting table at least provided with said manuscript guide member, said main body being removably mounted on said setting table in a predetermined position to provide said image reading apparatus, said main body being used for judging said image read width by said position detecting means and said judging means.

* * * * *